Oct. 7, 1930.    R. L. HINMAN ET AL    1,777,671
CAST METAL WHEEL
Filed Nov. 12, 1927
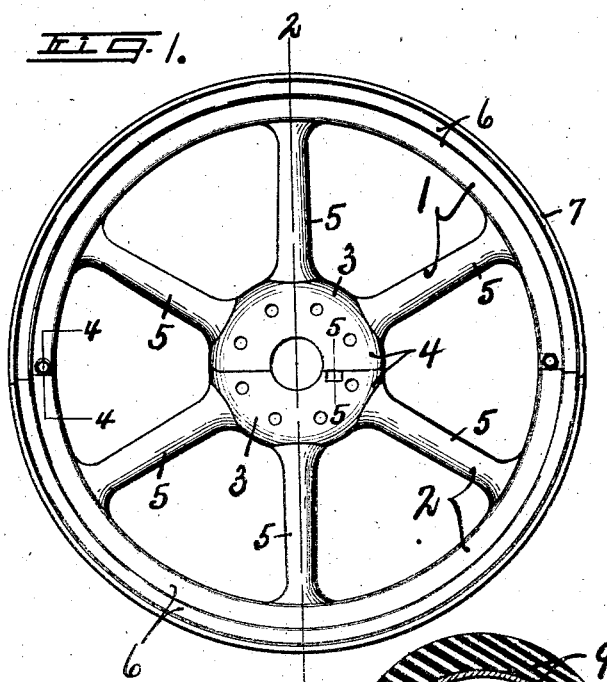
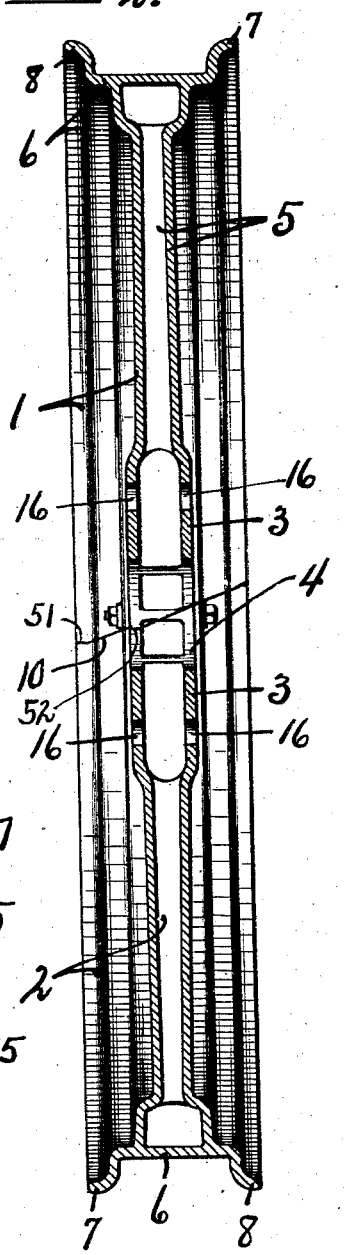
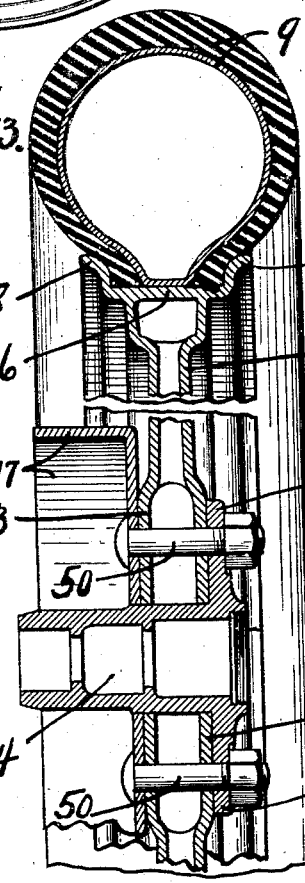
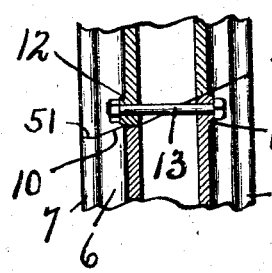
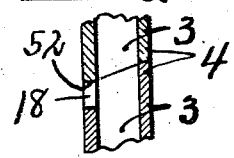
WITNESS
INVENTOR
R. L. Hinman and
W. H. Glenn
By Davison Thompson
ATTORNEYS.

Patented Oct. 7, 1930

1,777,671

UNITED STATES PATENT OFFICE

RALPH L. HINMAN AND WILLIAM H. GLENN, OF ONEIDA, NEW YORK

CAST METAL WHEEL

Application filed November 12, 1927. Serial No. 232,862.

This invention relates to a certain new and improved metal wheel.

An object of the invention resides in the production of a comparatively light but strong wheel which has a smoother and more pleasing appearance than present wheels of this type, due partly to the elimination of projecting bolts and lugs.

Further, the wheel is better balanced, due perhaps to a reduction of weight at the tire edge of the wheel and to the more symmetrical form of the wheel.

Further, the sections of the wheel are locked tightly in assembled condition by the mere inflation of a tire on the rim, and the tire can be removed from the wheel in a fraction of the time required with present wheels of this type.

Further, various sizes of wheels can be used on the same hub.

Other objects and advantages relate to the details of form, construction and arrangement of the wheel and parts thereof, all as will more fully appear from the following description taken in connection with the accompanying drawings, in which:

Figure 1 is an elevation of a wheel of this invention.

Figure 2 is a section on line 2—2, Figure 1.

Figure 3 is a partial section similar to Figure 2 showing the tire on the rim and the hub and brake drum secured in position.

Figure 4 is a section on line 4—4, Figure 1.

Figure 5 is a section on line 5—5, Figure 1.

The wheel of this invention is formed of a plurality of sections, as here illustrated two sections —1— and —2— of the same form and shape. Each section, as illustrated, comprises a portion —3— of an annular hollow central body —4—, and in this disclosure three spokes —5— and one-half of a channeled rim —6—. The parts —3—, —4— and —5— of each section, as shown, are an integral casting. The contacting parts of the sections when assembled, as shown in Figures 1 and 2, are so shaped and formed as to permit easy assemblage and separation as desired, for removing or replacing a tire upon the channeled rim —6—, and for this purpose, as perhaps best shown in Figure 2, the rim and the annular central body —2— of each section terminate in walls inclined with respect to the axis of the wheel. In other words, the axial plane of the substantially diametrical split of the assembled wheel is diagonally disposed with respect to the axis of the wheel.

The angle of inclination may vary considerably. This form of section results in the fact that the flange —6— on each section constitutes less of the circumference of the wheel than the flange —7—, but when the flange —6— on one section is combined with cooperating flange —7— on the other section, they jointly constitute a complete circumference of the wheel.

Further, in each section of the wheel one side —2— of the hollow central body —4— constitutes a greater percentage of the area of the side of the central body than the other portion —2—.

It will be apparent that assemblage of a sectional wheel in which the sections are formed, as illustrated with diagonally disposed meeting surfaces, the tire may be placed upon the rim —6— before the two sections are assembled in position shown in Figure 2, and then the diagonally disposed surfaces of the sections may be slid along one another to tension the tire and to bring the sections to the position shown in Figure 2, whereupon inflation of the tire will securely hold the sections in position.

It may in some cases be desirable to form the terminations of the flange —8— parallel with the axis of the wheel, as shown at 51, and also a small portion of the hub as shown at 52, but as these surfaces are comparatively short, they will not materially affect the assembling of the sections, as described, but will assist somewhat in holding them in assembled condition when the tire —9— is inflated.

In some cases it may be desirable, altho at present it does not appear necessary to form the rims —6— adjacent the diagonal split —10— with bosses —11— and —12— for the reception of bolt 13 to further secure the two sections of the rim together, diagonal disposition of the split —10— permitting such securement through the medium of an ordinary straight bolt.

Further, the hub —14— is passed through the central opening in the annular body —4— and the radial annular flange —15— is formed with openings registering with openings —16— extending through the annular body —4— for the reception of bolts —50— which also may extend through and secure brake drum —17— in proper position with respect to the wheel. The hub, therefore, constitutes a further means for rigidly uniting the sections of the wheel. One or both of the wheel sections may be formed with an opening —18— for the reception of an implement, such as a screw-driver by means of which separation of the two sections may be initiated when it is desired to remove a tire or disassemble a wheel.

As stated, it is considered at present that the bolts 13 will not be required particularly with small wheels, but they are disclosed here with the idea that in some cases it may be desirable to use them, particularly with large and heavy wheels. In their absence there are no projecting lugs or bolts which in any way mar the continuity of the surface of the wheel, which as shown is symmetrical in all respects, the spokes leading to the central portion of the rim —6— and being directly aligned with the central body —4—.

The diagonal disposition of the plane of cut separating the sections permits ready and easy assemblage, and disassemblage of the parts of the wheel with the tire, and under either condition the work can be effected much more rapidly and easily than with present cast sectional wheels of this type, and various sizes of wheels can be utilized with the same hub —14—, and altho we have shown and described a specific construction of wheel including as illustrated a definite number of sections, we do not desire to restrict ourselves to any particular number of sections of which the wheel shall be formed, nor to any specific form or shape of the sections except the essential diagonal disposition of the plane of cut between the sections, as various changes and modifications may be made within the scope of the appended claims.

We claim:

1. A metal wheel formed of two similarly shaped sections including hub sections, rim sections and means connecting the hub sections to their respective rim sections, marginal rim flanges at opposite sides of the rim sections adapted to confine the opposite edges of a tire and the contacting surfaces of the rim sections when assembled lying in a plane diagonally disposed with respect to the axis of the wheel, all so formed and arranged that when a tire is placed on the partially assembled wheel sections inflation of the tire will accurately aline the respective rim flanges of the rim sections to form two spaced continuous rims by lateral pressure of the edges of the tire on the respective rim flanges and then by such pressure, maintain the sections in that position while the tire remains inflated.

2. A metal wheel formed of two similarly shaped sections including hub sections, rim sections and means connecting the hub sections to their respective rim sections, marginal rim flanges at opposite sides of the rim sections adapted to confine the opposite edges of a tire and the contacting surfaces of the rim sections and the hub sections lying in the same plane diagonally disposed with respect to the axis of the wheel so that when a tire is placed on the partially assembled wheel sections, inflation of the tire will accurately aline the respective rim flanges of the rim sections to form two spaced continuous circumferential flanges by lateral pressure of the edges of the tire on the respective rim flanges and then by such pressure, maintain the sections in that position while the tire remains inflated.

3. A metal wheel formed of two similarly shaped sections including hub sections, rim sections and means connecting the hub sections to their respective rim sections, marginal rim flanges at opposite sides of the rim sections adapted to confine the opposite edges of a tire and the contact surfaces of the rim sections and the hub sections lying in the same plane diagonally disposed with respect to the axis of the wheel, and a pneumatic tire mounted on the wheel sections between the rim flanges and inflated to exert sufficient lateral pressure on the respective rim flanges so as to maintain the respective rim flanges on the wheel sections in alinement.

4. A metal wheel formed of two similarly shaped sections including hub sections, rim sections and means connecting the hub sections to their respective rim sections, marginal rim flanges at opposite sides of the rim sections adapted to confine the opposite edges of a tire and the contacting surfaces of the rim sections when assembled lying in a plane diagonally disposed with respect to the axis of the wheel, all so formed and arranged that when a tire is placed on the partially assembled wheel sections inflation of the tire will accurately aline the respective rim flanges of the rim sections to form two spaced continuous rims by lateral pressure of the edges of the tire on the respective rim flanges and then by such pressure, maintain the sections in that position while the tire remains inflated, and a rim bolt extending through the respective rim sections at each rim joint and a hub mounted within the hub sections.

5. A metal wheel formed of two similarly shaped sections including hub sections, rim sections and means connecting the hub sections to their respective rim sections, marginal rim flanges at opposite sides of the rim sections adapted to confine the opposite edges of a tire and the contacting surfaces of the rim sections and the hub sections lying in the same plane diagonally disposed with respect to the axis of the wheel so that when a tire is placed on the partially assembled wheel sections, inflation of the tire will accurately aline the respective rim flanges of the rim sections to form two spaced continuous circumferential flanges by lateral pressure of the edges of the tire on the respective rim flanges and then by such pressure, maintain the sections in that position while the tire remains inflated, a rim bolt extending through the respective rim sections at each rim joint, and a hub mounted within the hub sections.

6. A metal wheel formed of two similarly shaped sections including hub sections, rim sections and means connecting the hub sections to their respective rim sections, marginal rim flanges at opposite sides of the rim sections adapted to confine the opposite edges of a tire and the contact surfaces of the rim sections and the hub sections lying in the same plane diagonally disposed with respect to the axis of the wheel, a pneumatic tire mounted on the wheel sections between the rim flanges and inflated to exert sufficient lateral pressure on the respective rim flanges so as to maintain the respective rim flanges on the wheel sections in alinement, a rim bolt extending through the respective rim sections at each rim joint, and a hub mounted within the hub sections.

7. A metal wheel formed of two identical sections, each constituting one of the halves of a substantially diametrically split wheel and each comprising a hub section, a rim section, and means connecting the respective hub sections to their rim sections and having the contacting surfaces of the rim and hub sections in the same plane diagonally disposed with respect to the axis of the wheel, marginal rim flanges at opposite sides of the rim sections adapted to confine the opposite edges of a tire, all so formed and arranged that when a tire is placed on the partially assembled wheel sections inflation of the tire will accurately align the respective rim flanges of the rim sections to form two spaced continuous circular rims by lateral pressure of the edges of the tire on respective rim flanges.

In witness whereof we have hereunto set our hands this 4th day of November, 1927.

RALPH L. HINMAN.
WILLIAM H. GLENN.